United States Patent [19]

Marina

[11] Patent Number: 4,882,871
[45] Date of Patent: Nov. 28, 1989

[54] HOOK-DISGORGING DEVICE

[75] Inventor: Paolicchi Marina, Lucca, Italy

[73] Assignee: Nedo Berutto, San Marco, Italy

[21] Appl. No.: 312,974

[22] Filed: Feb. 21, 1989

[30] Foreign Application Priority Data

Feb. 22, 1988 [IT] Italy ................... 17704 A/88

[51] Int. Cl.⁴ ............................................ A01K 97/00
[52] U.S. Cl. ...................................................... 43/53.5
[58] Field of Search ........................................ 43/53.5

[56] References Cited

U.S. PATENT DOCUMENTS

| 2,793,463 | 5/1957 | Nieman | 43/53.5 |
| 3,034,252 | 5/1962 | Basinski | 43/53.5 |
| 4,206,561 | 6/1980 | Wong et al. | 43/53.5 |
| 4,342,171 | 8/1982 | Cripps et al. | 43/53.5 |

FOREIGN PATENT DOCUMENTS

| 2318691 | 11/1974 | Fed. Rep. of Germany | 43/53.5 |
| 1050686 | 9/1953 | France | 43/53.5 |
| 419305 | 3/1947 | Italy | 43/53.5 |
| 3292 | 3/1892 | United Kingdom | 43/53.5 |

Primary Examiner—M. Jordan
Attorney, Agent, or Firm—Fleit, Jacobson, Cohn, Price, Holman & Stern

[57] ABSTRACT

A disgorging device for removing hooks from the mouth of a fish, with a stem portion having a longitudinal axis, and a hook-disgorging head portion having an elongated aperture including a transverse slit on a side for inserting a fishing line; the aperture is delimited by line guiding surfaces extending into a groove for the fishing line on at least one side and along a longitudinal portion of the stem.

8 Claims, 1 Drawing Sheet

HOOK-DISGORGING DEVICE

BACKGROUND OF THE INVENTION

This invention relates to fishing tackle and in particular to a disgorging device or "disgorger" for releasing or removing a hook from the mouth or gullet of a fish.

Hook-disgorging devices currently used to remove a hook from a fish's mouth mainly comprise a stem, for example in metal or in plastic material, having at one or both ends a shaped head that is inserted into the mouth of the fish and applied to the hook so as to counteract the traction of the fishing line in the area where the hook is embedded in the mouth or gullet of the fish. The disgorging head of the device is rested on the fishing line and is guided by it in the direction of the hook to be removed.

With currently used disgorging device, this operation necessitates a certain manual dexterity owing to the insecure position of the line in the guiding groove; when visibility is poor or when it is dark these devices provide unreliable guidance towards the hook so that the latter is removed with considerable difficulty and after numerous attempts. Additionally, even if the disgorging head portion of the device comes into contact with the hook, the opposing action and thrust on the hook can only be applied endways or axially, and therefore in an insecure manner. Accordingly, currently used disgorging devices are not very practical in serving their designated purpose.

An object of this invention is to provide a disgorging device for removing hooks from the mouth or gullet of a fish by means of which it is possible to securely insert the fishing line into the disgorging head portion of the device, in order to ensure reliable guidance towards the hook to be removed.

A further object of this invention is to provide a disgorging device for removing hooks as described above, by means of which contact with the hook occurs laterally, in a way that is entirely guided by the line to which the hook is attached, without requiring any particular dexterity.

BRIEF DESCRIPTION OF THE INVENTION

These requisites can be obtained with a disgorging device according to the invention, for removing hooks from the mouth or gullet of a fish, comprising a stem having a longitudinal axis, and a hook-disgorging head at at least one of its ends to be guided along a fishing line connected to said hook until it engages with the hook to be removed, characterised by the fact that said hook-disgorging head comprises an annular elongated aperture having a transverse slit on a side for inserting the line, said aperture being delimited by inner line-guiding surfaces extending into a lateral groove on at least one side of said head, said groove extending along a portion of said stem.

The inner surfaces of the aperture for guiding the hook-removing head along the fishing line, preferably take the form of parallely arranged flat surfaces, which join with sliding surfaces for the line at the forward end of the head, in alignement with and on the side or sides where the lateral guiding grooves are located.

The hook-disgorging head preferably has an elongated ovoid shape, with the transverse slit for threading the fishing line positioned at an intermediate point of the aperture, in such a way as to facilitate the insertion of the head into the fish's mouth and the removal of the hook, after a brief rotary motion about the longitudinal axis of the disgorging device.

BRIEF DESCRIPTION OF THE DRAWINGS

The hook-disgorging device according to the invention will be described in greater detail below with reference to the attached drawings, provided purely by way of example. In the drawings.

DESCRIPTION OF THE INVENTION

Figure 1:
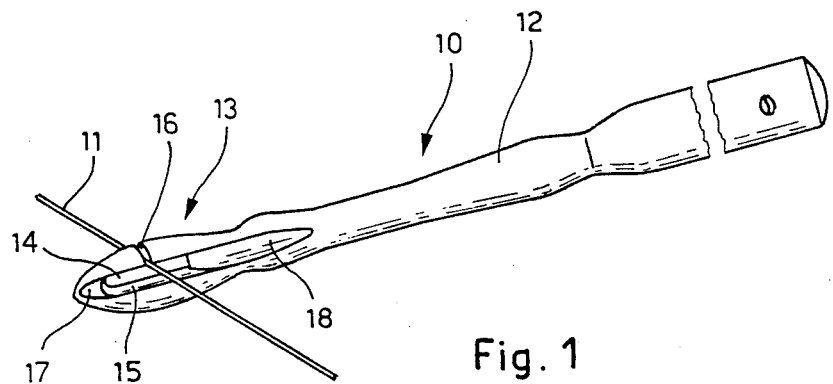
FIG. 1 is a perspective view of the device.
Figure 2:
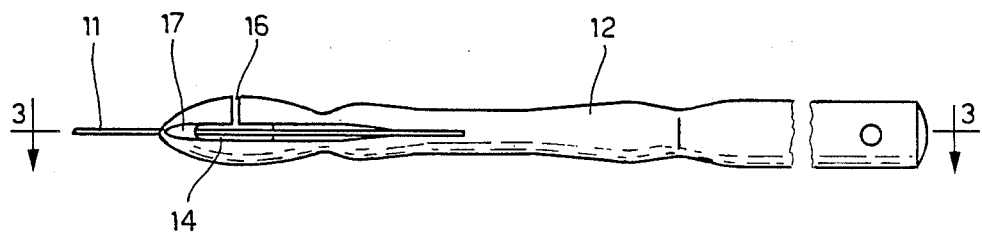
FIG. 2 is a lateral view of the device in FIG. 1.

In the various figures reference number 10 indicates the overall hook-disgorging device for removing hooks from a fish's gullet. Additionally, 11 indicates a fishing line, which is attached at one of its ends to a hook, not shown.

The disgorging device 10 mainly comprises a stem 12 extending in the direction of its longitudinal axis, said stem 12 having at at least one of its ends a hook-disgorging head 13 designed to be guided by the line 11 towards the hook to be removed.

Accordingly, the head 13 has a basically ovoid or elongated shape and is provided with a longitudinal aperture 14 delimited by opposing flat internal surfaces 15 which extend parallel to the longitudinal axis of the stem 12. The hook-disgorging head 13 also comprises on one side of the aperture 14 a transverse slit 16 through which the line 11 can be inserted, as shown diagramatically in FIG. 1, while holding the device 10 broadly perpendicular to the taut line: the width of the slit 16 is equal or slightly greater than the maximum allowable diameter of the appropriate fishing line and is preferably arranged in an intermediate position along the head 13 or the aperture 14 so as to provide reliable guidance along the line 11.

The internal flat surfaces 15 of the aperture 14 in the hook-disgorging head serve to guide the head 13 along the line 11 while the same head is inserted into the mouth and/or gullet of the fish for removing a hook; accordingly, the surfaces 15 joint at the forward end of the head 13 with the lateral surfaces of guide slots 17, each slot being aligned with a corresponding guide groove 18, on each side, extending backwards from the central aperture 14 of the head and for a certain distance lengthways along the stem 12. The grooves 18 can have any shape or disposition but, as shown, the grooves 18 converge about the longitudinal axis and towards the aperture 14 of the head 13.

In the case shown, the hook-disgorging head 13 is provided at only one end of the stem 12; it is clear, however, that the latter could comprise a head 13 at each of its ends, in which case the heads 13 would have different dimensions so as to accomodate hooks of different size.

Figure 3:
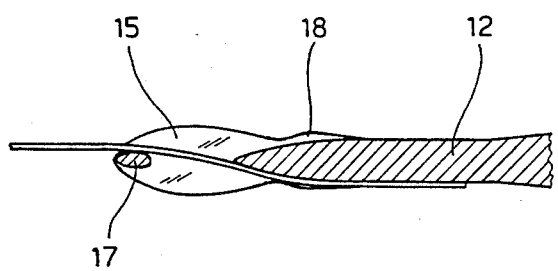
FIG. 3 is a longitudinal cross-sectional view along the line 3—3 in FIG. 2.

A description of the use of the disgorging device, for removing a hook which has become lodged in the mouth or gullet of a fish, is as follows. The device 10 is held pointed as shown in FIG. 1, that is perpendicularly to the fishing line 11, and the line is inserted into the aperture 14 through the transverse slit 16 of the head 13. The device is then turned and brought parallel to the fishing line 11, which is held taut throughout, with the fishing line positioned on opposing sides of the head 13, in the end slot 17 on one side and in the longitudinal groove 18 on the opposite side - as shown in FIG. 3. Under these conditions the disgorging device can be slid inside the fish's mouth or gullet, reliable guidance being provided by the fishing line 11. The head 13 is advanced until it encounters the hook to be removed, positioning itself sideways against the hook which consequently can be easily disengaged and removed after gently rotating the device in both directions, while keeping the line 11 taut throughout.

It will be clear that the presence of an ovoid shaped head having an elongated guiding opening or aperture to slide along the fishing line, and the presence of a transverse slit for inserting the fishing line makes the device work reliably without the user needing to have any particular manual dexterity; accordingly, complete reliability is ensured in operation even under insecure conditions or in poor visibility.

What is claimed is:

1. A disgorging device for removing hooks from the mouth and gullet of a fish comprising a stem portion having a longitudinal axis and a hook-disgorging head portion at at least one of said stem portion, to be guided along a fishing line connected to a hook to be removed, said head portion comprising an annular elongated aperture, having a transverse slit on a side for inserting the fishing line, said aperture being delimited internally by opposite guiding surfaces extending into a rear guiding groove on each side and along a longitudinal portion of the stem.

2. A device as claimed in claim 1, in which said transverse slit for inserting the fishing line is in an intermediate position along said elongated aperture of the head portion.

3. A device as claimed in claim 1, comprising a hook-disgorging head has an elongated ovoid shape.

4. A device as claimed in claim 1, in which said guiding surfaces of the disgorging head comprise parallely arranged flat surfaces.

5. A device as claimed in claim 1, in which said transverse slit for inserting the fishing line is arranged perpendicular to the longitudinal axis of said stem portion.

6. A device as claimed in claim 1, in which said internal surfaces of the elongated aperture of said head portion join with guiding slots at the forward end of the hook-disgorging head.

7. A device as claimed in claim 1, in which each forward guiding slot is aligned with a rear guiding groove.

8. A device as claimed in claim 1, in which the rear guiding grooves are converging about the longitudinal axis of the stem portion and towards the central aperture of the hook-disgorging head.

* * * * *

UNITED STATES PATENT AND TRADEMARK OFFICE
CERTIFICATE OF CORRECTION

PATENT NO. : 4,882,871

DATED : November 28, 1989

INVENTOR(S) : Paolicchi Marina

It is certified that error appears in the above-identified patent and that said Letters Patent is hereby corrected as shown below:

Title page:

Line [75], kindly change the inventor's name from "Paolicchi Marina" to --Marina PAOLICCHI--.

Signed and Sealed this

Eighth Day of January, 1991

Attest:

HARRY F. MANBECK, JR.

*Attesting Officer*     Commissioner of Patents and Trademarks